United States Patent [19]
Lacour

[11] Patent Number: 5,891,279
[45] Date of Patent: Apr. 6, 1999

[54] SAFETY SUPPORT MADE OF A FLEXIBLE ELASTOMERIC MATERIAL FOR TIRES

[75] Inventor: Jean-Charles Lacour, Clermont-Ferrand, France

[73] Assignee: Compagnie Generale des Etablissements Michelin—Michelin & Cie, Clermont-Ferrand Cedex 01, France

[21] Appl. No.: 819,698

[22] Filed: Mar. 12, 1997

[30] Foreign Application Priority Data

Mar. 19, 1996 [FR] France .................................. 96 03492

[51] Int. Cl.⁶ .................................................. B60C 17/04
[52] U.S. Cl. ......................................... 152/520; 152/381.5
[58] Field of Search ............................. 152/5, 7, 11, 516, 152/520, 379.3, 379.4, 379.5, 381.3, 381.4, 381.5, 381.6

[56] References Cited

U.S. PATENT DOCUMENTS

| | | |
|---|---|---|
| 3,219,090 | 11/1965 | Cislo ........................................... 152/7 |
| 4,157,107 | 6/1979 | Cataldo ............................. 152/381.4 X |
| 4,248,286 | 2/1981 | Curtiss, Jr. et al. . |
| 4,293,016 | 10/1981 | Bible et al. ......................... 152/520 X |
| 4,461,333 | 7/1984 | Filliol et al. . |
| 4,773,461 | 9/1988 | Landers et al. . |
| 5,355,923 | 10/1994 | Boni et al. ........................... 152/381.6 |
| 5,363,894 | 11/1994 | Gouttebessis et al. . |

FOREIGN PATENT DOCUMENTS 2238513  6/1991  United Kingdom ................... 152/516

*Primary Examiner*—Russell D. Stormer
*Attorney, Agent, or Firm*—Baker & Botts, L.L.P.

[57] ABSTRACT

Safety support essentially made of a flexible elastomeric material including a substantially cylindrical base, a substantially cylindrical cap and an annular body connecting the base and the cap. The body has, on one side, which is intended to be placed on the outboard side of the vehicle, a plurality of cavities extending substantially axially as far as at least halfway into said body without passing through it.

12 Claims, 4 Drawing Sheets

SAFETY SUPPORT MADE OF A FLEXIBLE ELASTOMERIC MATERIAL FOR TIRES

BACKGROUND OF THE INVENTION

The present invention relates to safety supports for vehicle tires, which are mounted inside the tires on their wheel rims in order to take up the load in the event of tire failure. In particular, it proposes an improved support essentially made of a flexible elastomeric material.

The use of a safety support of annular shape made of a flexible elastomeric material has been known for a very long time. Such a support has the advantages of not being sensitive to impacts, of offering good stability of performance over time and of not causing too pronounced a deterioration of the behavior of the tire if it has to run flat.

By contrast, such a support has two major defects: unacceptable weight, bearing in mind the current requirements of motor manufacturers to reduce the weights of the axles of their vehicles, and highly insufficient endurance under run-flat conditions as a result of the heating-up of the material which is likely to lead to very swift thermal degradation.

In order to solve these defects, Patent Application FR 2 532 591 proposes a safety support essentially made of elastomeric material in the shape of an H which is symmetric relative to a longitudinal mid-plane with a wide circumferential channel in its radially lower part for lightening it and reducing its rigidity, the circumferential channel in its radially outer part being a housing for a strap for holding the support on the wheel rim. This support effectively gives a lower weight and acceptable endurance, but at the expense of the support having a radial rigidity which is relatively high because it is higher than 750 kg/cm, which detracts from the quality of the behavior of the tire under run-flat conditions.

SUMMARY OF THE INVENTION

The subject of the invention is a safety support made of an essentially flexible elastomeric material for which the compromise between behavioral performance, weight and endurance is greatly improved.

The safety support intended to be mounted on a wheel rim inside a tire equipping a vehicle, in order to support the tread strip of this tire in the event of a loss of inflation pressure, is characterized in that it is essentially made of a flexible elastomeric material, and in that it includes:

a substantially cylindrical base intended to fit around the wheel rim, a substantially cylindrical cap intended to come into contact with the tread strip in the event of a loss of pressure, and leaving a clearance with respect thereto at nominal pressure, and an annular body connecting said base and said cap, said body having a plurality of cavities directed substantially axially and emerging in that face of said body which is intended to be placed on the outboard side of the vehicle and which extend axially as far as at least halfway into said body without passing through it.

The annular body preferably has the same axial width as the base.

The transverse cavities in this support according to the invention allow a very great reduction in weight of the support as compared with a solid support and define two regions in the body of the support which mechanically work in very different ways:

a first, annular, region, which is solid which means that, throughout the range of radial loads to which it is likely to be subjected under run-flat conditions, it opposes these radial loads with compressive stress without buckling; the rigidity in compression of this region is high enough that it undergoes only small-amplitude deformations, and therefore heats up only to a limited extent;

a second, annular, region, arranged on the outboard side of the vehicle, comprising the transverse cavities which are open on the side of the annular body; this region is appreciably more flexible than the previous region and thus allows a large area of contact between the cap of the support and the radially inner surface of the cap of the tire to be maintained without puckering, and thus gives a large area of contact between the ground and the surface of the tread strip of the tire under run-flat conditions, thereby opposing any possible puckering of this tread strip.

In the previous paragraph, puckering is understood to mean that the area of contact between, for example, the surface of the tread strip and the ground is not continuous but on the contrary comprises interruptions between the entry and exit of this contact area. In these interruptions the tread strip lifts up and is no longer in contact with the ground. This phenomenon is due to the longitudinal compression forces exerted on the cap of the tire as it runs flat in the contact area, and puckering results from the slight compressibility of the cap of the tire. The same phenomenon exists for the supports. In the case of the support of the invention, it is the longitudinal compressibility of the flexible cap around the hollowed region associated with the chosen geometry and with the flexible elastomeric material which allows this puckering to be eliminated.

A decisive advantage of the safety support according to the invention is that the flexibility of the cap of the support allows it to come to bear progressively against the radially internal wall of the cap of the tire with bearing pressures which are uniform and without puckering. As a result, as has been seen, the area of contact between the tire tread strip and the ground also remains large, with reduced risks of the tread strip puckering and therefore with even contact pressures. Puckering of this tread strip would immediately result in a very uneven distribution of contact pressures and therefore very degraded behavior of the vehicle, especially in cornering.

Under cornering, the most highly loaded tires are those situated on the outside of the turn. It is these tires which are carrying the highest load because of the centrifugal forces. They often have a pronounced camber, that is to say that their longitudinal mid-plane is not perpendicular to the ground but is also inclined towards the outside of the turn. All this leads to the tread strip of the tires on the outside of the turn being more heavily loaded. Under run-flat conditions, this phenomenon is also very pronounced.

By contrast, as the tires placed on the inside of the turn are markedly less heavily loaded, it is not necessary for the safety support according to the invention to be symmetrical, and this makes it possible to limit the width of support needed, as well as its weight.

The transverse cavities also allow effective ventilation of the support and this limits its heating-up to admissible temperatures.

This combination ensures that a vehicle with at least one tire running flat behaves excellently because the behavior is barely altered by this running flat. This combination also gives exceptional endurance because it has been observed that it is possible to cover several hundreds of kilometers at speeds of the order of 100 km/h under run-flat conditions with zero inflation pressure.

According to an advantageous alternative form, the walls defined between two adjacent cavities are arched. These walls thus bend very progressively in the event of radial loading, with deformations in bending. This makes it possible to avoid any phenomenon of buckling which would be likely to contribute a pronounced discontinuity when running flat.

The special geometry of the aforementioned cavities makes it possible advantageously to use flexible elastomeric materials with shore A hardness of less than 70, and preferably of between 60 and 70.

In some applications, it may also be advantageous also to produce cavities emerging on the side intended to be placed on the inboard side of the vehicle. These cavities then extend substantially axially but are markedly shorter than those which emerge on the opposite side intended to be placed on the outboard side of the vehicle.

DESCRIPTION OF THE DRAWINGS

One embodiment of the invention is now given without implied limitation with the aid of the attached drawing in which.

DESCRIPTION OF PREFERRED EMBODIMENTS

Figure 1:
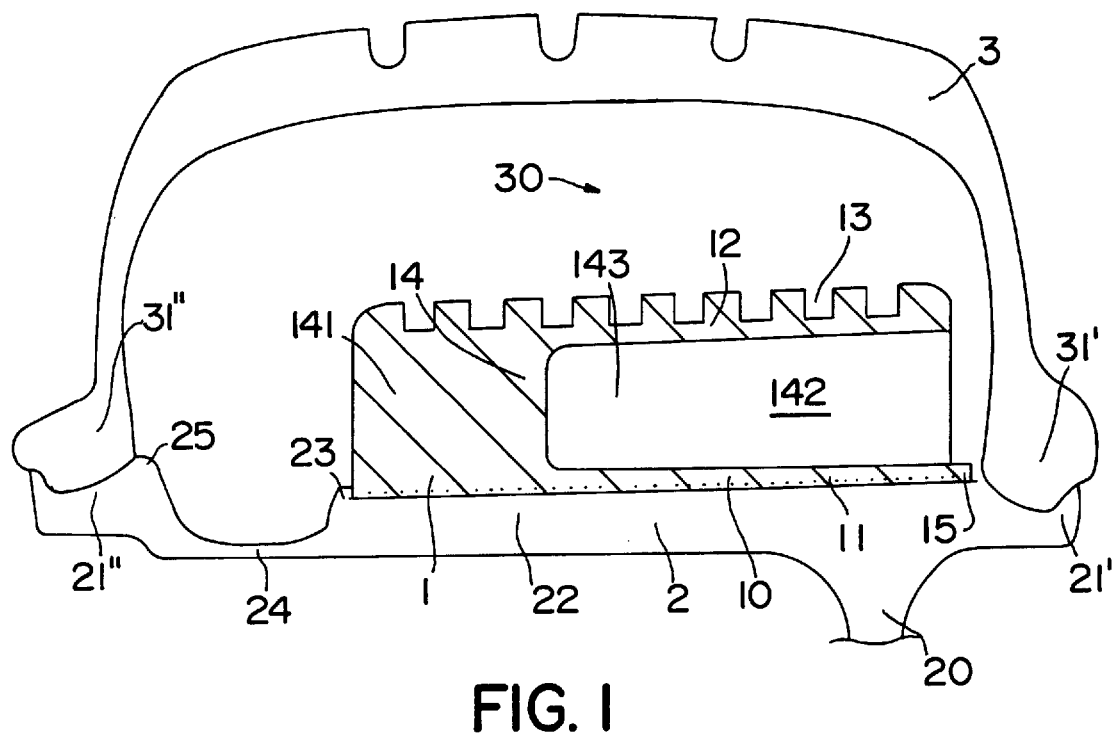
FIG. 1 shows an axial half-section of a safety support according to the invention mounted on a preferential wheel rim inside the cavity of a tire.

FIG. 1 shows a safety support 1 according to the invention mounted around a preferential wheel rim 2 and inside the cavity 30 of a corresponding tire 3. This embodiment is dimensioned to equip a small touring vehicle such as a Renault Twingo. The size of the tire 3 is 145×360 where 145 corresponds to the width of the tire in millimeters and 360 to the diameter of the wheel rim 2, again in millimeters.

The wheel rim 2 forms part of a one-piece wheel. This wheel rim 2 comprises axially, starting from the same side as the wheel disk 20, namely from the side intended to be on the outboard side of the vehicle:

a first seat 21', a flat cylindrical region 22 intended to receive the safety support 1 according to the invention, the diameter of this region 22 is greater than that of the seat 21' so as to allow the safety support to be mounted easily and directly by slipping it on axially, a stop 23 for the transverse immobilization of the support, a mounting well 24, this well 24 is of minimized size by comparison with conventional mounting wells, a second seat 21" preceded by a retaining hump 25, the diameter of this second seat is greater than the diameter of the region 22.

One feature of this wheel rim is that the two seats 21' and 21" are angled in the opposite direction to the seats of conventional wheel rims.

The tire 3 is designed to be mounted on the wheel rim 2 and in particular has two beads 31' and 31" of different diameters.

The support 1 comprises three main parts:

a) a base 10 of annular overall shape and reinforced with a ply 11 oriented longitudinally at substantially 0°;

b) a substantially annular cap 12 with longitudinal grooves 13 in its radially outer wall;

c) an annular body 14 for joining the base 10 and the cap 12 together.

Figure 3:
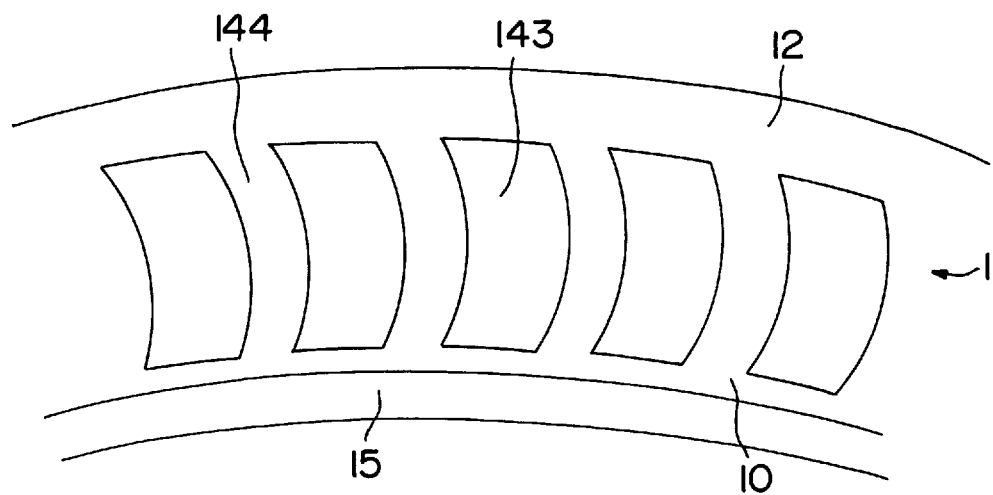
FIG. 3 is a partial lateral view of the safety support of FIG. 1, from the cavities side.

The section of FIG. 1 shows a first solid part 141 of the body 14 as well as a second part 142 including cavities 143 stretching axially over substantially more than half the body 14, emerging on the outer side in a substantially axial direction. These cavities 143 are (FIG. 3) uniformly distributed around the entire circumference of the body 14 and define radial walls 144 which provide a direct radial connection between the cap 12 and the base 10 of the support 1. The walls 144 have an arched shape. This geometry has the advantage of loading these axial walls 144 in bending rather than in compression when they are crushed. The cavities 143 and therefore the walls 144 are in sufficient number that they give uniform support under run-flat conditions.

The cavities 143 make it possible very substantially to reduce the weight of the support 1. By way of example, in the preferred embodiment illustrated in FIGS. 1 to 3, with walls 144 7 mm thick, with a pattern repeat of 19 mm, extending over 70% of the axial width of the support, the weight represents just 67% of that of the corresponding solid support.

The radial walls 144 are directed axially in this embodiment. They could also diverge from this axial orientation by a maximum of 30 degrees. Increasing the angle of inclination relative to the axial direction increases the radial rigidity of the support while retaining the other parameters of geometry and of rigidity of identical materials. Beyond 30 degrees the increase in rigidity proves excessive.

The elastomeric material chosen in this embodiment has a Shore A hardness of 60 to 70. The radial rigidity of that part of the support 1 which comprises the solid part 141 is of the order of 420 kg/cm and the radial rigidity of that part which comprises the hollowed part 142 is 160 kg/cm. This means that 70% of the load is borne by the solid part and 30% by the part comprising the cavities.

In this example, the base 10 of the support is reinforced with a ply 11 oriented at substantially zero degrees. This ply 11 is preferably composed of a circumferential reinforcement with a high modulus to guarantee that the support is virtually inextensile circumferentially, and therefore is held on the wheel rim 2 whatever the rotational speed of the tire. This ply also has low flexural rigidity, to allow the substantial deformation required to insert the support into the tire before mounting them on the wheel rim 2.

In this embodiment, the base comprises a cylindrical stop 15 intended to block the adjacent bead 31' of the tire 3 in position. The second bead 31" is immobilized by the usual hump 25.

The height of the safety support is chosen to be such that in all normal use of the tire it does not lead to contact even with appreciable temporary overload. This height corresponds substantially to half the height of the torus-shaped cavity 30 between the wheel rim and the cap of the tire.

A material based on saturated-chain elastomer, like an EPDM, is preferably chosen as material from which to make the support.

In order to improve the endurance performance of the support, a lubricant is included inside the cavity 30 of the tire 3, in the usual way, in order to lubricate any contact there may be between the cap of the support and the cap of the tire.

Such a safety support 1 may be made in the usual way by injection-molding, for example.

Figure 5:
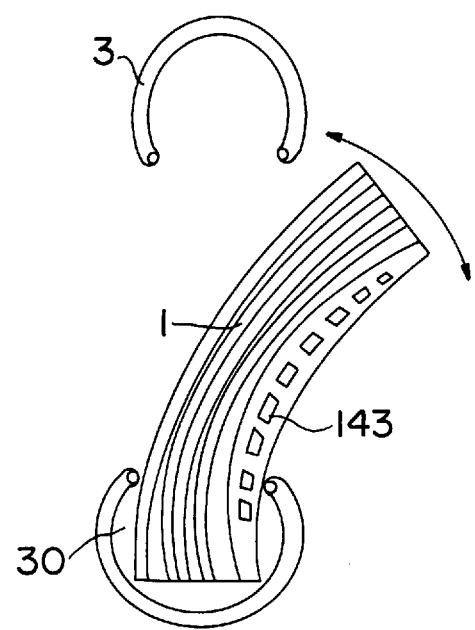
FIG. 5 is a view illustrating the deformation imposed on a support as it is inserted inside the cavity of a tire.

To assemble the device shown in FIG. 1, the first step is to insert the safety support 1 inside the torus-shaped cavity 30 of the tire 3. A first part of the support is inserted into this cavity of the tire. Next, the opposite part of the support is tilted (see FIG. 5) axially outside of the longitudinal midplane of the support 1 in such a way that it can enter the opposite part of the tire. The fact that the support is essentially made of a flexible elastomeric material quite obviously makes this tilting easier so that this can be achieved quite readily by hand without the use of any tools. The tire and support assembly is then placed around the wheel rim starting with the larger-diameter bead 31" of the tire 3. This bead 31" is placed in the mounting well 24 and at the same time the support 1 is placed around the region 22 of the wheel rim 2. Next, the first bead 31" is passed beyond the hump 25 and onto the seat 21", thanks to the mounting well 24. This first bead 31" is mounted on its seat 21" from the outside, and finally the second, small-diameter bead 31' of the tire 3 is mounted on its seat 21', also from the outside of this seat.

Figure 2:
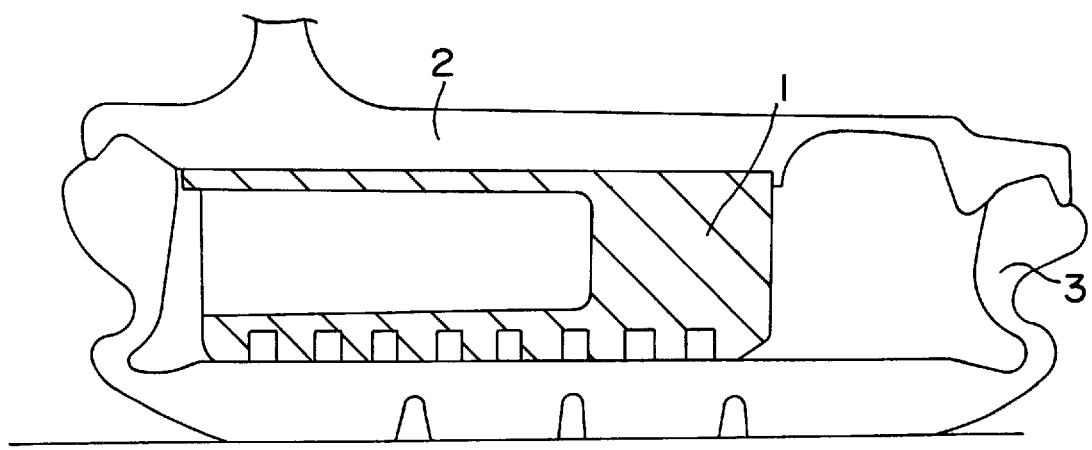
FIG. 2 is a half-section similar to that of FIG. 1, in which the safety support is in the run-flat condition.

FIG. 2 shows a safety device similar to that of FIG. 1, while it is in operation. The cap 12 of the support 1 is in contact with the radially inner surface of the cap of the tire 3.

A critical point in dimensioning a support 1 is determining the axial width of the annular solid part 141. The relative axial width of this annular solid part 141 is defined as being the ratio between the axial width of this annular solid part and the overall axial width of the support. By way of example, for a relative axial width of 5%, the life of the support with a touring vehicle of the RENAULT make, Twingo model, was 150 kilometers when running under full load at 100 km/h and with zero inflation pressure. However, once the width exceeds 15%, the life under the same test conditions exceeded 600 kilometers. Of course, a further increase in the width of the solid part increases the weight and reduces the ventilation of the support. The most appropriate dimensions and rigidities need therefore to be determined on a case by case basis as a function of the vehicles to be equipped.

A safety support 1 according to the invention may also, of course, be mounted on a conventional two-part wheel rim with a flat base.

Figure 4:
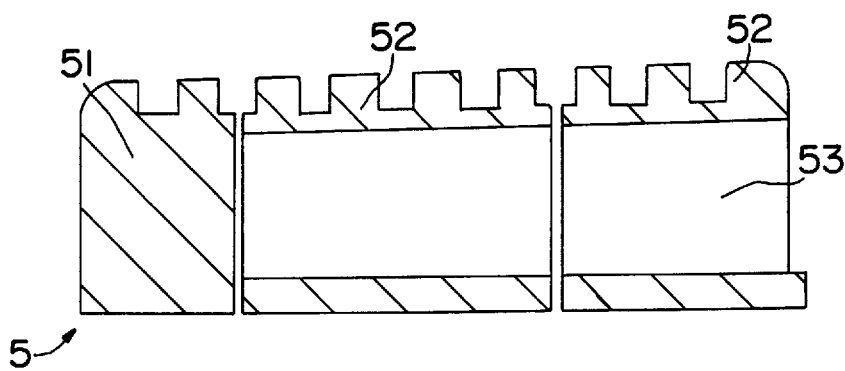
FIG. 4 shows, in axial half section, a second embodiment of a support according to the invention.

According to a second embodiment shown in FIG. 4, the safety support 5 consists of several rings:

- a ring 51 with a substantially rectangular axial section; and
- one or more annular elements 52, here there are two of them, having a plurality of cavities 53 extending substantially axially over their entire widths and substantially uniformly distributed around their circumferences. These annular elements 52 are intended to be placed on the wheel rim 2 relative to the ring 51 on the side intended to be placed on the outboard side of the vehicle. As before, each annular element 51 and 52 has a cap 12 intended to come to bear against the radially inner surface of the cap of the tire and a base 10 intended to be in contact with a wheel rim 2. The bases 10 comprise a longitudinal reinforcing element 11 to guarantee that it is practically inextensile longitudinally.

This second embodiment has properties very close to the first, but is easier to insert inside a tire owing to the lower flexural rigidity of its various annular elements.

Figure 6:
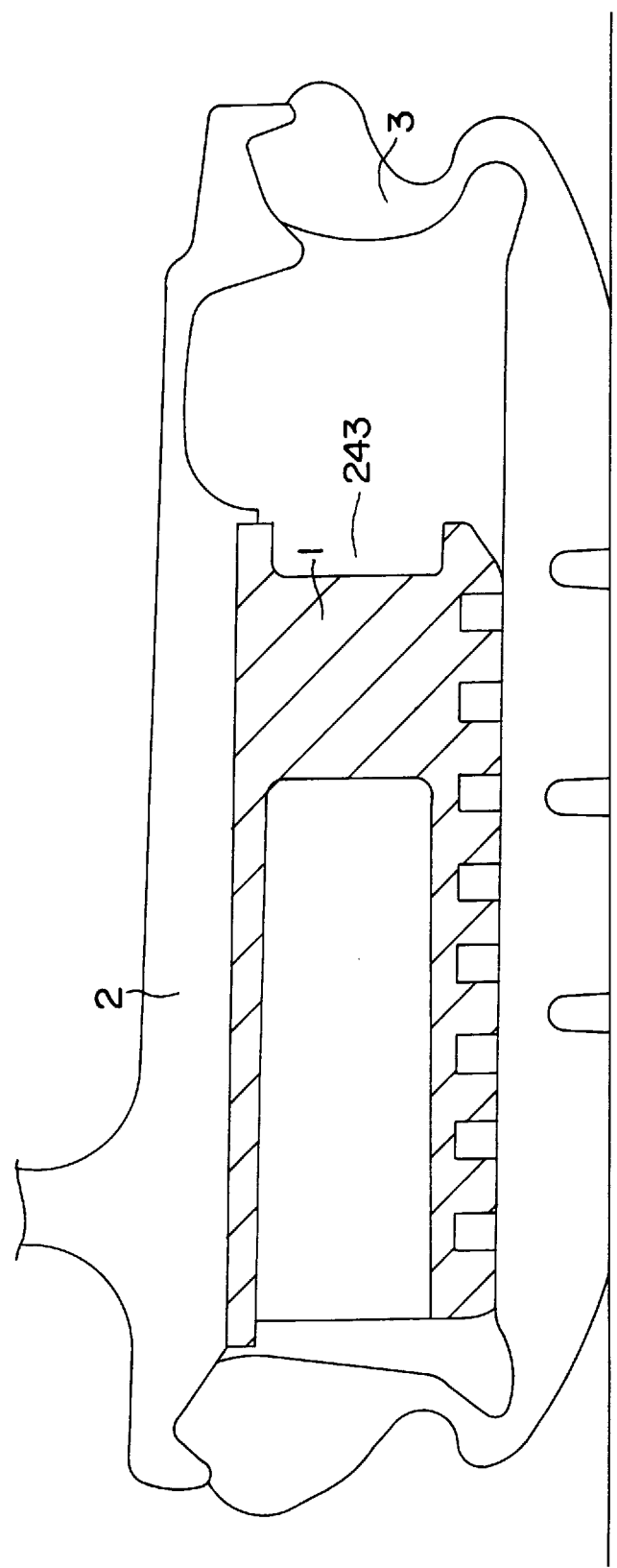
FIG. 6 is a view similar to FIG. 2 showing an alternative embodiment of the safety support.

In some cases, as shown in FIG. 6, it may also be advantages to provide a safety support with cavities 243 emerging on the side intended to be placed on the inboard side of the vehicle. These cavities extend substantially axially but are much shorter than those which emerge on the opposite outboard side of the vehicle.

I claim:

1. A safety support intended to be mounted on a wheel rim inside a tire equipping a vehicle, in order to support the tread strip of this tire in the event of a loss of inflation pressure, said support being characterized in that it is essentially made of a flexible elastomeric material, and in that it includes:
    - a substantially cylindrical base intended to fit around the wheel rim,
    - a substantially cylindrical cap intended to come into contact with the tread strip in the event of a loss of pressure, and leaving a clearance with respect thereto at nominal pressure, and
    - an annular body connecting said base and said cap, said body having a plurality of cavities directed substantially axially and emerging in that face of said body which is intended to be placed on the outboard side of the vehicle and which extend axially as far as at least halfway into said body without passing through it.

2. A support according to claim 1, in which the annular body has the same axial width as the base.

3. A support according to claim 1 in which the adjacent cavities are separated by arched walls.

4. A support according to claim 1 in which the cavities extend in a direction of less than 30 degrees relative to the axial direction.

5. A support according to claim 1 in which the flexible elastomeric material has a shore A hardness of less than 70, and preferably of between 60 and 70.

6. A support according to claim 1 in which the flexible elastomeric material is based on a saturated-chain elastomer.

7. A support according to claim 1 in which the base comprises substantially inextensile longitudinal strengthening means.

8. A support according to claim 1 in which the cap comprises circumferential grooves on its radially outer surface.

9. A support according to claim 1 in which the annular body further has a plurality of cavities directed substantially axially, these emerging in that face of said body which is intended to be placed on the inboard side of the vehicle.

10. A support according to claim 1 made of at least two independent annular portions intended to be arranged side by side around the wheel rim.

11. A safety support made of flexible elastomeric material and intended to be mounted on a wheel rim inside a tire of a vehicle in order to support the tread of the tire in the event of a loss of inflation, said safety support comprising an annular body having an inner surface intended to fit around the wheel rim, an outer cap intended to be engaged by the tread in the event of a loss of pressure, a plurality of substantially axially extending cavities arranged at one end of the annular body, the cavities having inner and outer ends, the outer ends emerging from the end face of said body, and a relatively solid and more rigid part of the body adjacent the inner ends of the cavities, the cavities extending at least half across said body.

12. A safety support as said forth in claim 11 including a plurality of cavities shorter in length directed substantially axially and emerging from the opposite end face of the body.

\* \* \* \* \*